(12) United States Patent
Ward

(10) Patent No.: US 10,984,505 B2
(45) Date of Patent: Apr. 20, 2021

(54) IMAGE DEMOSAICING SYSTEM AND METHOD

(71) Applicant: DOLBY LABORATORIES LICENSING CORPORATION, San Francisco, CA (US)

(72) Inventor: Gregory John Ward, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/956,595

(22) PCT Filed: Jan. 15, 2019

(86) PCT No.: PCT/US2019/013682
§ 371 (c)(1),
(2) Date: Jun. 21, 2020

(87) PCT Pub. No.: WO2019/143626
PCT Pub. Date: Jul. 25, 2019

(65) Prior Publication Data
US 2021/0027423 A1    Jan. 28, 2021

Related U.S. Application Data

(60) Provisional application No. 62/617,709, filed on Jan. 16, 2018.

(30) Foreign Application Priority Data

Jan. 16, 2018   (EP) .................................... 18151852

(51) Int. Cl.
*G06T 3/40*    (2006.01)
*H04N 9/04*    (2006.01)
*H04N 9/64*    (2006.01)

(52) U.S. Cl.
CPC ....... *G06T 3/4015* (2013.01); *H04N 9/04557* (2018.08); *H04N 9/646* (2013.01)

(58) Field of Classification Search
CPC ... G06T 3/4015; H04N 9/04557; H04N 9/646
(Continued)

(56) References Cited

U.S. PATENT DOCUMENTS

| 7,376,288 B2 | 5/2008 | Huang |
| 7,652,700 B2 | 1/2010 | Takahashi |

(Continued)

FOREIGN PATENT DOCUMENTS

| JP | 2011143100 | 7/2011 |
| WO | 2017093253 | 6/2017 |

OTHER PUBLICATIONS

Chung, K.H. et al "Color Demosaicing Using Variance of Color Differences" IEEE Transactions on Image Processing, /ol. 15, No. 10, Oct. 1, 2006. (Year: 2006).*

(Continued)

*Primary Examiner* — Jeffery A Williams

(57) ABSTRACT

A method for demosaicing an image captured by an image sensor includes (a) computing, for each of a first plurality of interpolated pixel-values and based on neighboring primary pixel-values, a respective first confidence value; (b) generating a first thresholded mapping from a first coordinate mapping by removing each interpolated pixel-value having a first confidence value less than a threshold value; (c) repeating steps of computing and generating for a second and third sub-plurality of sensor pixels to yield a second and a third thresholded mapping; (d) determining high-confidence array-coordinates as array-coordinates included in all (Continued)

thresholded mappings, remaining array-coordinates being low-confidence array-coordinates; (e) forming a refined image including, at each high-confidence array-coordinate, a respective pixel-value-triplet including one primary pixel-value and two interpolated pixel-values; and (f) filling the refined image by assigning, for each low-confidence array-coordinate, a pixel-value based on pixel-values of neighboring high-confidence array-coordinates.

15 Claims, 8 Drawing Sheets

(58) Field of Classification Search
 USPC ........................................................ 348/222.1
 See application file for complete search history.

(56) References Cited

U.S. PATENT DOCUMENTS

| | | |
|---|---|---|
| 8,493,473 B2 | 7/2013 | Zimmer |
| 8,638,342 B2 | 1/2014 | Cote |
| 9,129,393 B2 | 9/2015 | Bosco |
| 9,530,195 B2 | 12/2016 | Ng |
| 9,582,853 B1 | 2/2017 | Oh |
| 2009/0092338 A1 | 4/2009 | Achong |
| 2010/0182466 A1 | 7/2010 | Chang |
| 2017/0053379 A1 | 2/2017 | Wang |
| 2017/0161872 A1 | 6/2017 | Ma |

OTHER PUBLICATIONS

Chung, K.H. et al "Color Demosaicing Using Variance of Color Differences" IEEE Transactions on Image Processing, vol. 15, No. 10, Oct. 1, 2006.

Hore, A. et al "An Edge-Sensing Generic Demosaicing Algorithm with Application to Image Resampling" IEEE Transactions on Image Processing, vol. 20, No. 11, Nov. 1, 2011.pp. 3136-3150.

Jeon, G. et al "Demosaicking of Noisy Bayer-Sampled Color Images with Least-Squares Luma-Chroma Demultiplexing and Noise Level Estimation" IEEE Transactions on Image Processing, vol. 22, No. 1, Jan. 2013, 146-56.

Lee, Ji Won, et al "Adaptive Demosaicing Algorithm Using Characteristics of the Color Filter Array Pattern" Deformation Models, Dec. 17, 2013, vol. 11, pp. 29-53.

Losson, O. et al "Chapter 5-Comparison of Color Demosaicing Methods" Advances in Imaging and Electron PHY, vol. 162, Jan. 1, 2010, pp. 173-265.

Wu, X. et al "Primary-Consistent soft-Decision Color Demosaic for Digital Camera" Proceedings International Conference on Image Processing, vol. 1-477-80, 2003.

* cited by examiner

IMAGE DEMOSAICING SYSTEM AND METHOD

CROSS REFERENCE TO RELATED APPLICATIONS

This application claims priority to U.S. Provisional Application No. 62/617,709 and European Patent Application No. 18151852.3, both filed on Jan. 16, 2018; and each of which is incorporated by reference in its entirety.

BACKGROUND

Accurate rendering of high-dynamic range (HDR) images and video requires an image processor configured to demosaic a raw image received by a camera such that the resulting image is free of artifacts introduced by the demosaicing process. Color artifacts is a common problem in existing demosaicing processes.

In K.-H. Chung et al "*Color Demosaicing Using Variance of Color Differences*" IEEE Transactions on Image Processing, volume 15, issue 10, October 2006, pages 2944-2955, an adaptive demosaicing algorithm is presented. Missing green samples are first estimated based on the variances of the color differences along different edge directions. The missing red and blue components are then estimated based on the interpolated green plane. This algorithm may preserve the details in texture regions and, at the same time, it may reduce the color artifacts. Further, in Ji Won Lee et al "*Adaptive demosaicing algorithm using characteristics of color filter array pattern*" in "Deformation models", 17 Dec. 2013, Springer Netherlands, Dordrecht, volume 11, pages 29-53, the color filter array (CFA) image is interpolated considering the correlation between color channels. The proposed method estimates the horizontal and vertical interchannel differences directly in the CFA image to determine the direction of interpolation. Then, three color components (R/G/B) are interpolated along the estimated horizontal and vertical directions considering the differences of absolute interchannel differences and a post-processing is included to improve the interpolated image.

SUMMARY OF THE EMBODIMENTS

Embodiments disclosed herein remedy the aforementioned color artifacts problem of existing demosaicing processes. A method for demosaicing an image captured by an image sensor is disclosed. The image sensor has an arrayed plurality of sensor pixels each located at a respective one of a plurality of array-coordinates. The plurality of sensor pixels includes (i) at a first sub-plurality of array-coordinates, a first sub-plurality of sensor pixels each filtered by a respective first color filter, (ii) at a second sub-plurality of array-coordinates, a second sub-plurality of sensor pixels filtered by a respective second color filter, and (iii) at a third sub-plurality of array-coordinates, a third sub-plurality of sensor pixels filtered by a respective third color filter. The method includes steps of computing, generating, determining, forming, and filling.

The step of computing includes computing, for each of a first plurality of interpolated pixel-values and based on neighboring primary pixel-values, a respective one of a plurality of first confidence values each corresponding to an array-coordinate of either the second or the third plurality of array-coordinates. The first plurality of interpolated pixel-values is interpolated from neighboring primary pixel-values, of a first plurality of primary pixel-values, generated by the first sub-plurality of sensor pixels.

The step of generating includes generating a first thresholded mapping from a first coordinate mapping by removing each interpolated pixel-value, and array-coordinate mapped thereto, having a first confidence value less than a threshold value. The first coordinate mapping includes each of the second and the third plurality of array-coordinates mapped to a respective one of a first plurality of interpolated pixel-values.

The method also includes repeating the steps of computing and generating for the second sub-plurality of sensor pixels to yield a second thresholded mapping. The method also includes repeating the steps of computing and generating for the third sub-plurality of sensor pixels to yield a third thresholded mapping.

The step of determining includes determining a plurality of high-confidence array-coordinates as array-coordinates, of the plurality of array-coordinates, included in each of the first, second, and third thresholded mappings, remaining array-coordinates being a plurality of low-confidence array-coordinates. The step of forming includes forming a refined image that includes, at each of the plurality of high-confidence array-coordinates, a respective pixel-value-triplet including one primary pixel-value and two interpolated pixel-values. The step of filling includes filling the refined image by assigning, for each of the plurality of low-confidence array-coordinates, a pixel-value based on pixel-values of neighboring high-confidence array-coordinates.

An image demosaicer for processing an image captured by an image sensor in disclosed. The image demosaicer includes a memory and a microprocessor. The memory stores non-transitory computer-readable instructions and adapted to store the image. The microprocessor adapted to execute the instructions to perform the aforementioned method.

DETAILED DESCRIPTION OF THE EMBODIMENTS

Figure 1:
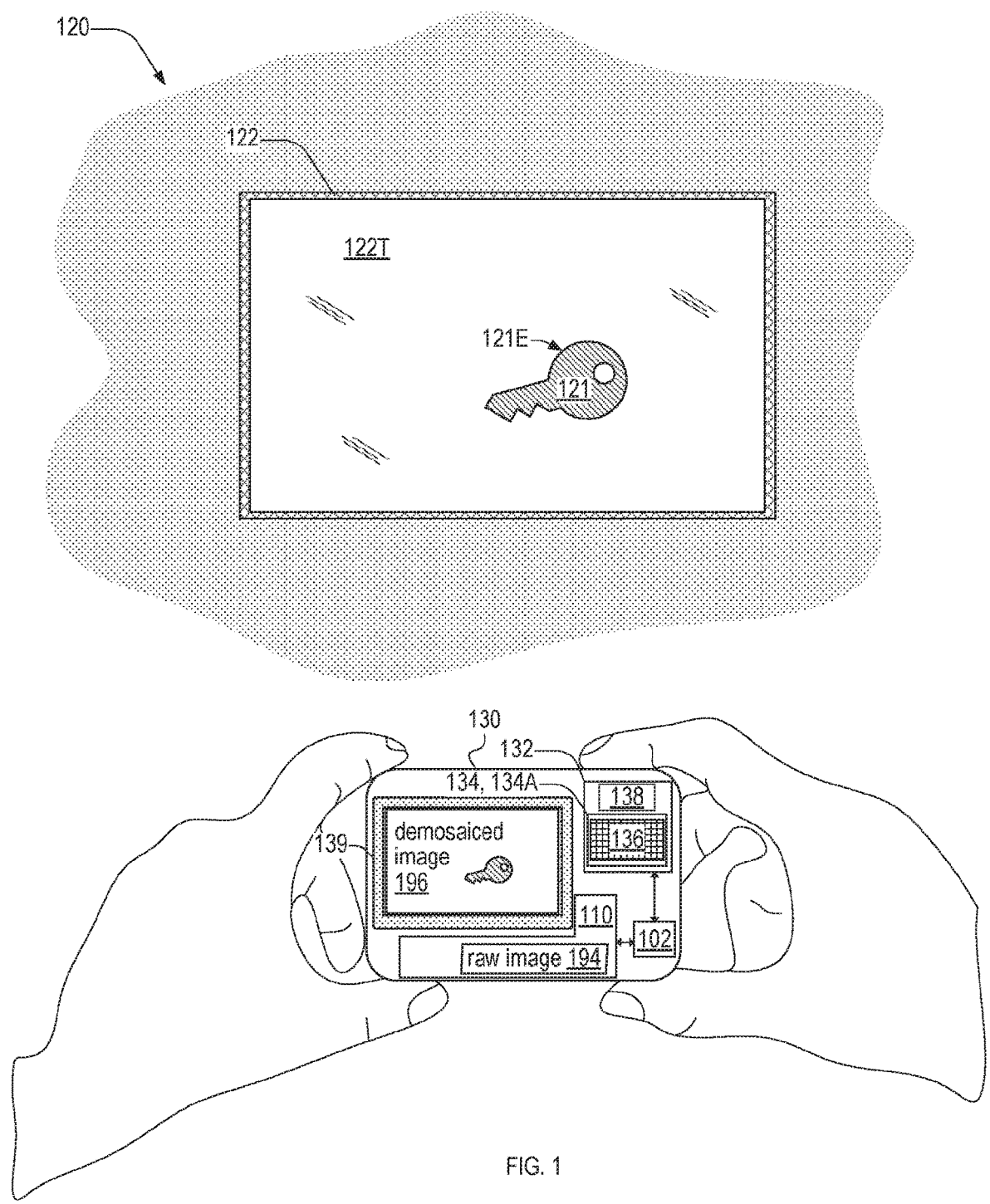
FIG. 1 depicts an HDR scene imaged by a camera onto an image sensor thereof.

As an example illustrating advantages of embodiments presented herein, FIG. 1 depicts a camera 130 imaging a scene 120 having a high dynamic range of luminance Scene 120 includes a plan view of a key 121 on a top surface 122T of a light box 122, which emits light. Camera 130 includes an imaging lens (not shown), an image sensor 132, a memory 110, and a microprocessor 102 communicatively coupled to image sensor 132. Image sensor 132 includes a pixel array 134A, which may have a color filter array (CFA) 136 thereon. Pixel array 134A includes a plurality of pixels 134, not shown in FIG. 1 for clarity of illustration. Each color filter of CFA 136 is aligned with a respective pixel 134 of pixel array 134A. The imaging lens images scene 120 onto image sensor 132. Image sensor 132 also includes circuitry 138 that includes at least one analog-to-digital converter.

Each pixel 134 has a respective pixel charge corresponding to a respective intensity of light from a scene 120 imaged onto pixel array 134A. Circuitry 138 converts each pixel charge to a respective one of a plurality of pixel-values, which are stored in memory 110 as a raw image 194. Camera 130 may include a display 139 configured to display raw image 194 as a demosaiced image 196.

In scene 120, light box 122 emits light through top surface 122T. Key 121 is opaque and appears black, such that key 121 and top surface 122T have substantially different luminosities, and hence scene 120 has a high dynamic range of luminosity. Key 121 has an edge 121E, represented as a non-dashed curve about the perimeter of key 121. An accurate HDR image of scene 120 would include, at edge 121E, pixels with pixel-values corresponding to only black, white, or gray-scale pixel-values. However, a standard HDR imaging, demosaiced image 196 includes false-color edge artifacts, in which the image of edge 121E includes pixels having pixel-values corresponding to colors, rather than a gray-level. Embodiments presented herein, e.g., of image demosaicing methods and systems implementing these methods, produce a demosaiced image 196 without the aforementioned image artifacts.

Figure 2A:
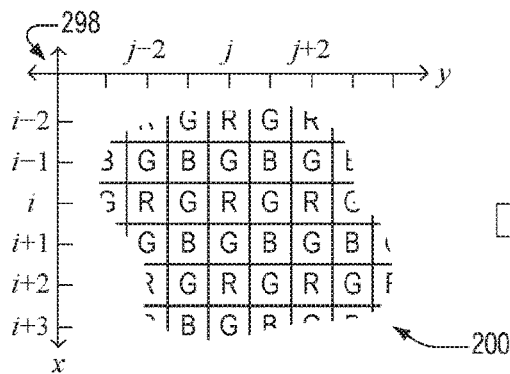
FIG. 2A is a schematic plan view of a region of the image sensor of FIG. 1, and a corresponding region of a raw image generated therefrom, in an embodiment.
Figure 2A:
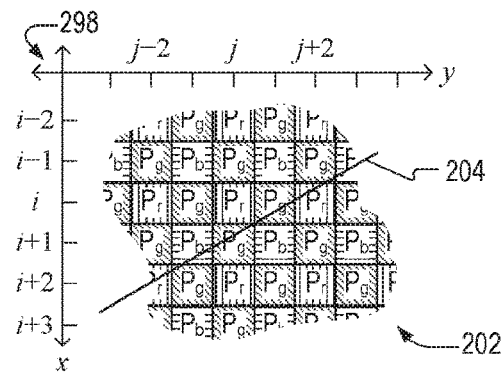

FIG. 2A is a schematic plan view of a region of an image sensor 200 and a corresponding region of a raw image 202 generated by image sensor 200. Image sensor 200 and raw image 202 are positioned with respect to an x-y coordinate system 298.

Image sensor 200 is an example of image sensor 132, in which CFA 136 includes a plurality of red (R), green (G), and blue (B) color filters arranged in a Bayer pattern. Coordinates (x,y) denote locations of each color filter and pixel therebeneath. For example, image sensor 200 includes a red color filter at coordinate (i,j), where i and j are integers. For example, G(i+1,j) refers to the green color filter at coordinate (i+1,j). CFA 136 may include different color filters without departing from the scope hereof. For example, CFA 136 may include arrays of at least one of cyan, magenta, yellow, and clear color filters. A clear color filter is transparent to at least one of visible and near-infrared light.

Raw image 202 is an example of raw image 194, and includes a plurality of primary pixel-values $P_r$, a plurality of primary pixel-values $P_g$, and a plurality of primary pixel-values $P_b$. Raw image 202 may include an imaged-edge 204, which is, for example, an image of a region of edge 121E. FIG. 2A illustrates imaged-edge 204 schematically as a skew line with respect to row and columns of pixel array 134A and CFA 136.

Each primary pixel-value $P_r$ is generated by a respective pixel 134 beneath a red color filter of CFA 136. Each primary pixel-value $P_g$ is generated by a respective pixel 134 beneath a green color filter of CFA 136. Each primary pixel-value $P_b$ is generated by a respective pixel 134 beneath a blue color filter of CFA 136. For example, primary pixel-values $P_r$, $P_g$, and $P_b$ at respective coordinates (i,j), (i,j+1), and (i+1,j+1) are generated by respective pixels of image sensor 200 at the same respective coordinates (i,j), (i,j+1), and (i+1,j+1). Expressed more concisely, and introducing a notational convention used herein, primary pixel-values $P_r(i,j)$, $P_g(i,j+1)$, and $P_b(i+1,j+1)$ are generated by respective pixels of image sensor 200 beneath color filters R(i,j), G(i,j+1), and B(i+1,j+1).

Figure 2B:
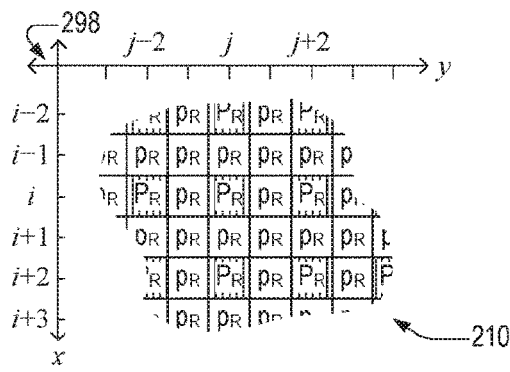
FIGS. 2B, 2C, and 2D are, respectively, example schematic views of a red channel, green channel, and blue channel generated from the raw image of FIG. 2.
Figure 2C:
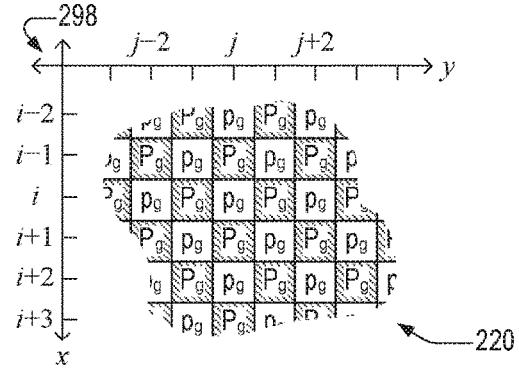
Figure 2D:
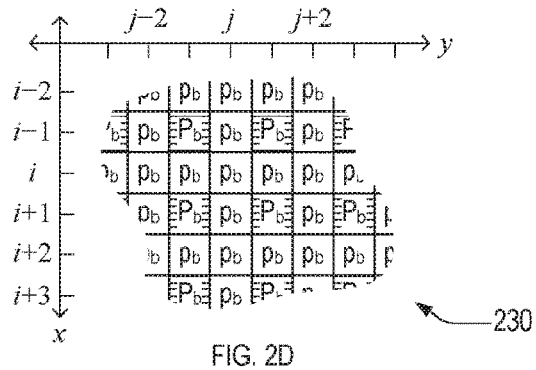

FIGS. 2B, 2C, and 2D are, respectively, schematic views of a red channel 210, a green channel 220, and a blue channel 230 generated from raw image 194. Channels 210, 220, and 230 are positioned with respect to x-y coordinate system 298.

Red channel 210 includes primary pixel-values $P_r$ of raw image 194 at locations corresponding to red pixels of CFA 136. Red channel 210 also includes, for each primary pixel-value $P_r$, three interpolated pixel-values $P_r$, which are interpolated from neighboring primary pixel-values $P_r$. Each interpolated pixel-value $p_r$ is mapped to a respective coordinate (x,y), such that red channel 210 includes a coordinate mapping of a plurality of coordinates (x,y) to one of a respective plurality of interpolated pixel-values $p_r$.

Green channel 220 includes primary pixel-values $P_g$ of raw image 194 at locations corresponding to green color filters of CFA 136. Green channel 220 also includes, for each primary pixel-value $P_g$, two interpolated pixel-values $p_g$, which are interpolated from neighboring primary pixel-values $P_G$. Each interpolated pixel-value $p_g$ is mapped to a respective coordinate (x,y), such that green channel 220 includes a coordinate mapping of a plurality of coordinates (x,y) to one of a respective plurality of interpolated pixel-values $p_g$.

Blue channel 230 includes primary pixel-values $P_b$ of raw image 194 at locations corresponding to blue pixels of CFA 136. Blue channel 230 also includes, for each primary pixel-value $P_b$, three interpolated pixel-values $p_b$, which are interpolated from neighboring primary pixel-values $P_b$. Each interpolated pixel-value $p_b$ is mapped to a respective coordinate (x,y), such that blue channel 230 includes a coordinate mapping of a plurality of coordinates (x,y) to one of a respective plurality of interpolated pixel-values $p_b$.

Figure 2E:
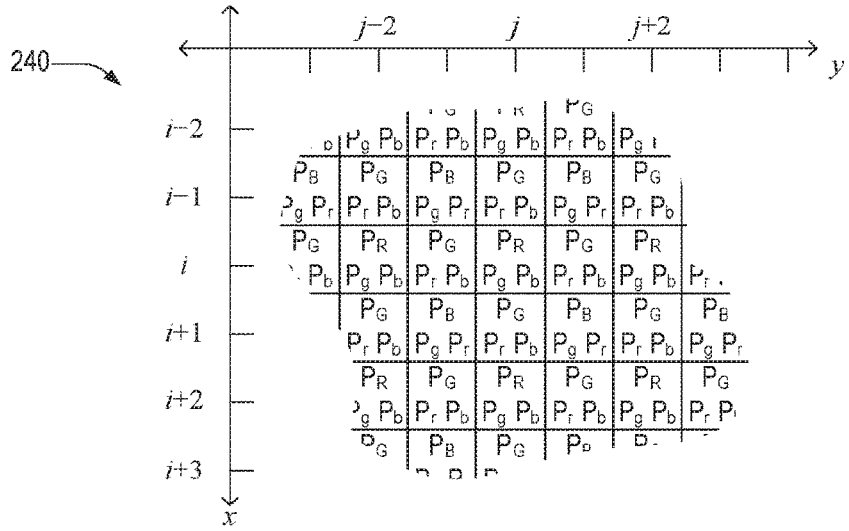
FIG. 2E is a schematic view of a demosaiced image, which is a combination of the channels of FIGS. 2B-2D.

FIG. 2E is a schematic view of a demosaiced image 240, which is a combination of red channel 210, green channel 220, and blue channel 230. Demosaiced image 240 includes a plurality of display pixels each associated with a pixel-value triplet that includes one primary pixel-value ($P_r$, $P_g$, or $P_b$) and two interpolated pixel-values ($p_r$, $p_g$, or $p_b$). Demosaiced image 240 may include edge artifacts similar to those in demosaiced image 196 at edge 121E.

Figure 3:
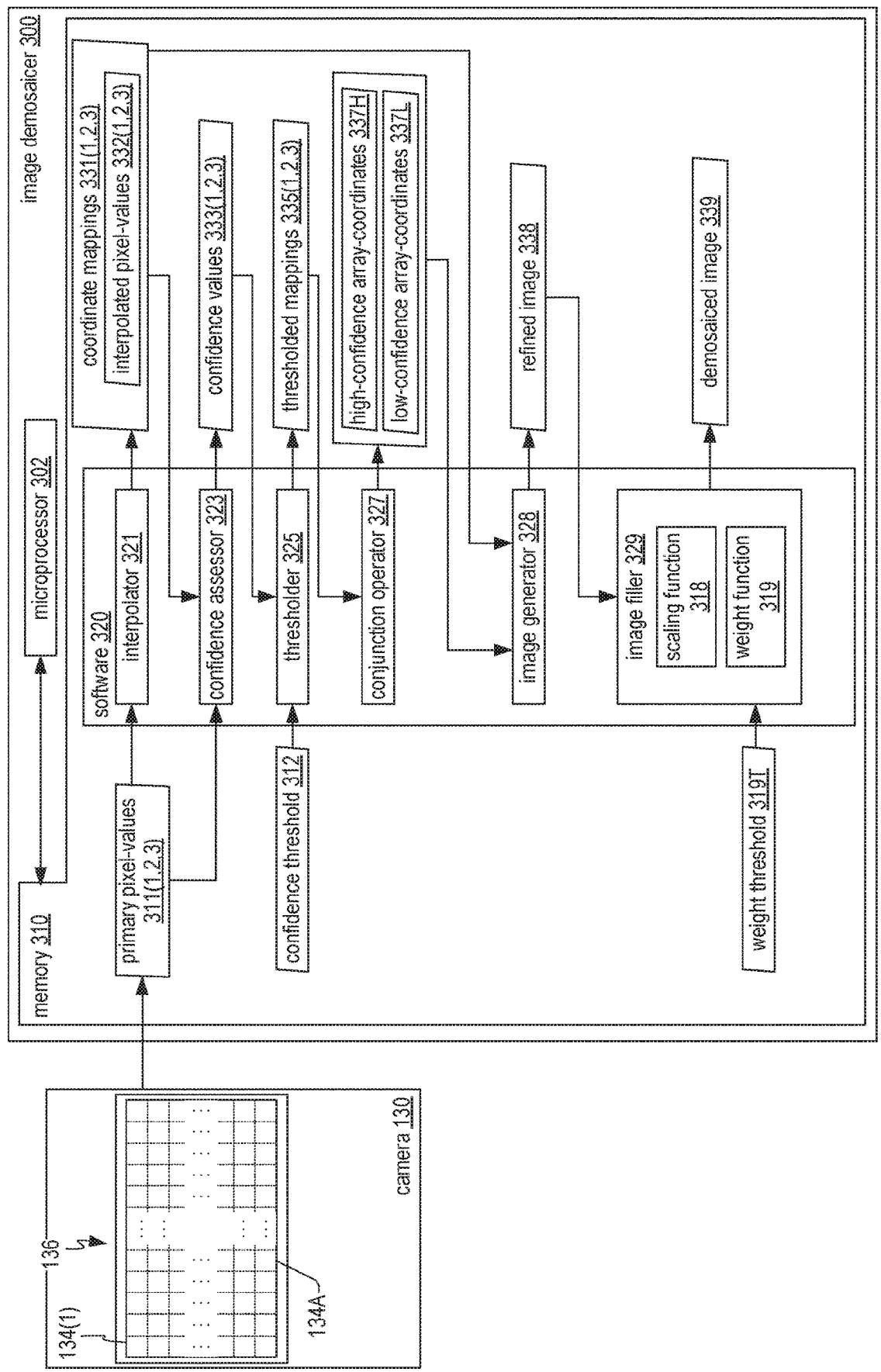
FIG. 3 is a schematic diagram of an image demosaicer configured to generate, from the raw image of FIG. 2, an output image that lacks edge-artifacts, in an embodiment.

FIG. 3 is a schematic diagram of an image demosaicer 300 configured to generate, from raw image 202, a demosaiced image 339 that lacks edge-artifacts. Image demosaicer 300 includes a microprocessor 302 and a memory 310 that stores software 320 that includes computer-readable instructions. Microprocessor 302 may be a digital signal processor such as an image processor. Memory 310 may be transitory and/or non-transitory and may include one or both of volatile memory (e.g., SRAM, DRAM, VRAM, or any combination thereof) and nonvolatile memory (e.g., FLASH, ROM, magnetic media, optical media, or any combination thereof).

Memory 310 and microprocessor 302 may function as memory 110 and microprocessor 102, respectively, of camera 130, FIG. 1. Microprocessor 302 is adapted to execute the instructions to perform functions of image demosaicer 300 as described herein. Memory 310 may store at least one of primary pixel-values 311, a confidence threshold 312, a weight threshold 319T, coordinate mappings 331, confidence values 333, thresholded mappings 335, low-confidence array-coordinates 337L, high-confidence array-coordinates 337H, refined image 338, and demosaiced image 339. Computer-readable instructions of software 320 includes an interpolator 321, a confidence assessor 323, a thresholder 325, a conjunction operator 327, an image generator 328, and an image filler 329. Image filler 329 may include at least one of a scaling function 318 and a weight function 319, either of which may be stored as a look-up table. Pixels located at low-confidence array-coordinates 337L and high-confidence array-coordinates 337H may be referred to as low-confidence pixels and high-confidence pixels respectively.

Primary pixel-values $P_r$, $P_g$, and $P_b$ of raw image 202, FIG. 2, are examples of primary pixel-values 311. Coordinate mappings 331(1,2,3) include respective interpolated pixel-values 332(1,2,3). Interpolated pixel-values $p_r$, $p_g$, and $p_b$ of channels 210, 220, and 230 are examples of interpolated pixel-values 332(1,2,3), respectively. Accordingly, channels 210, 220, and 230, which include interpolated pixel-values mapped to coordinates, are, respectively examples of coordinate mappings 331(1), 331(2), and 331(3).

Primary pixel-values 311 and demosaiced image 339 may be stored in memory 310 in either an image file format, such as JPEG and TIFF, or a raw image format, such as TIFF/EP and Digital Negative (DNG). Pixel-values 311, 332 and demosaiced image 339 may be stored in a same format or a different format. In an embodiment, at least one of pixel-values 311, 332 and demosaiced image 339 are stored in a volatile memory of memory 310, and demosaiced image 339 is stored in a nonvolatile memory of memory 310.

Figure 4:
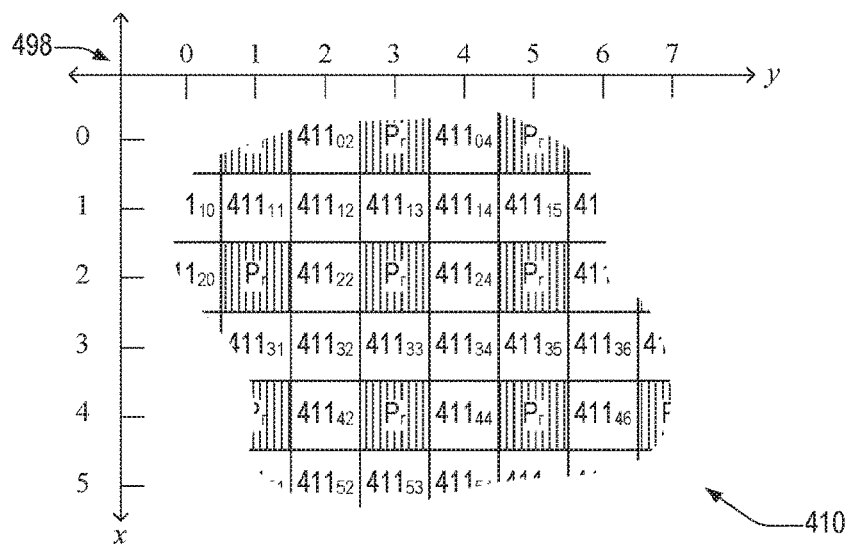
FIGS. 4, 5, and 6 illustrate, respectively, example regions of a red, a green, and a blue confidence map corresponding to the red, green, and blue channel of FIGS. 2B, 2C, and 2D, respectively.
Figure 5:
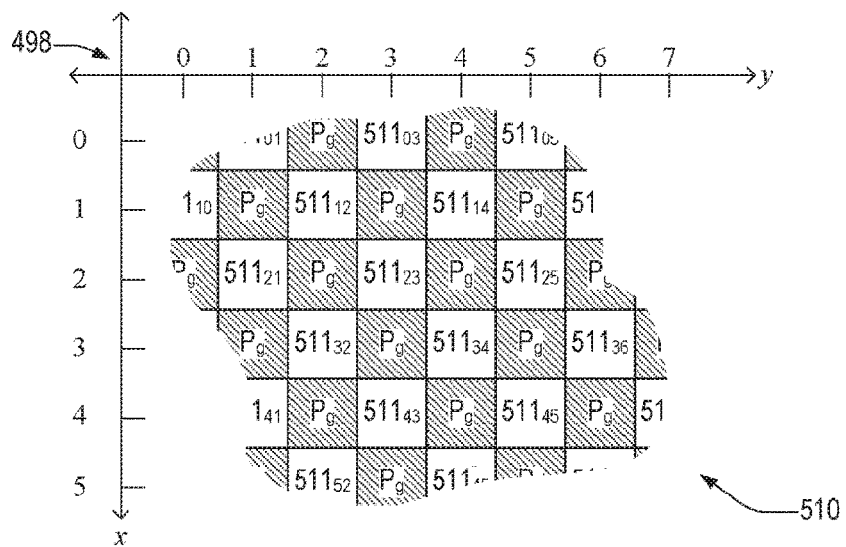
Figure 6:
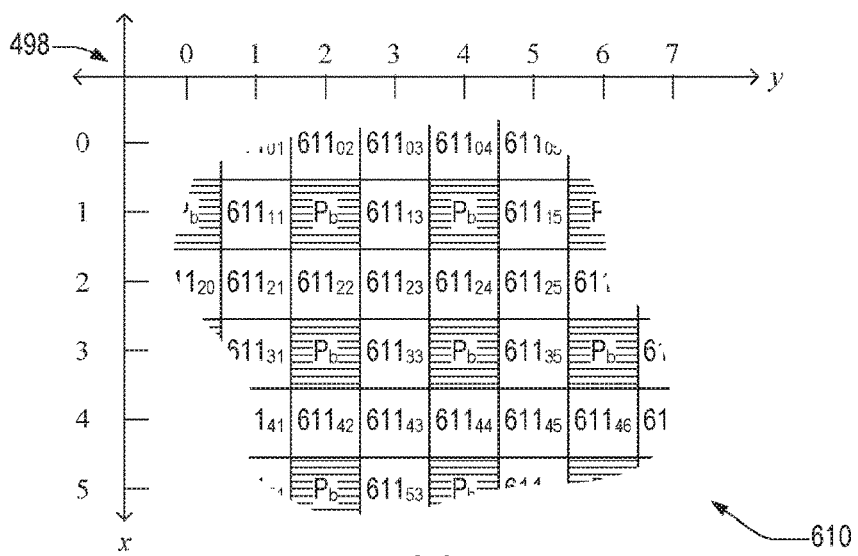

FIGS. 4-6 illustrate regions of, respectively, a red confidence map 410, a green confidence map 510, and a blue confidence map 610. Confidence maps 410, 510, and 610 include, respectively, a plurality of confidence values 411, 511, and 611. Confidence values 411 are, collectively, an example of confidence value 333(1) generated by confidence assessor 323 and stored in memory 310 of image demosaicer 300. Confidence values 511 are, collectively, an example of confidence value 333(2). Confidence values 611 are, collectively, an example of confidence value 333(3).

As shown in FIG. 4, each of the plurality of confidence values 411 are mapped to a respective coordinate (x,y) of red channel 210. For example, confidence value $411_{35}$ is mapped to (x,y) coordinate (3,5). Red confidence map 410 is shown with respect to a coordinate system 498, which is an example of coordinate system 298 with i=2 and j=3.

As shown in FIG. 5, each of the plurality of confidence values 511 are mapped to a respective coordinate (x,y) of green channel 220. For example, confidence value 51123 is mapped to (x,y) coordinate (2,3). Green confidence map 510 is shown with respect to coordinate system 498.

As shown in FIG. 6, each of the plurality of confidence values 611 are mapped to a respective coordinate (x,y) of blue channel 230. For example, confidence value $611_{23}$ is mapped to (x,y) coordinate (2,3). Blue confidence map 610 is shown with respect to coordinate system 498.

In general, each confidence value $411_{xy}$, $511_{xy}$, $611_{xy}$ may be indicative of a spatial similarity (e.g. a pixel intensity evolution in a region) or a spectral similarity (e.g. a correlation of different spectral bands) of neighboring primary-pixel-values from which the interpolated pixel-value at coordinate (x,y) was computed. Each confidence value $411_{xy}$, $511_{xy}$, $611_{xy}$ may be, for example, indicative of the degree of uniformity of neighboring primary-pixel-values from which the interpolated pixel-value at coordinate (x,y) was computed. Such uniformity may be, for example, a relative difference or standard deviation of neighboring primary-pixel-values. In confidence map 410, FIG. 4, confidence value $411_{24}$ is, for example, a relative difference of side-adjacent primary pixel-values $P_r$ at coordinates (2,3) and (2,5). Confidence value $411_{34}$ is, for example, a standard deviation of corner-adjacent primary pixel-values $P_r$ at coordinates (2,3), (2,5) (4,3), and (4,5). In confidence map 510, FIG. 5, confidence value $511_{34}$ is, for example, a standard deviation of side-adjacent primary pixel-values $P_g$ at coordinates (2,4), (3,3) (3,5), and (4,4). In confidence map 610, FIG. 6, confidence value $611_{24}$ is, for example, a relative difference of side-adjacent primary pixel-values $P_b$ at coordinates (1,4) and (3,4). Confidence value $611_{23}$ is, for example, a standard deviation of corner-adjacent primary pixel-values $P_b$ at coordinates (1,2), (1,4) (3,2), and (3,4).

Figure 7:
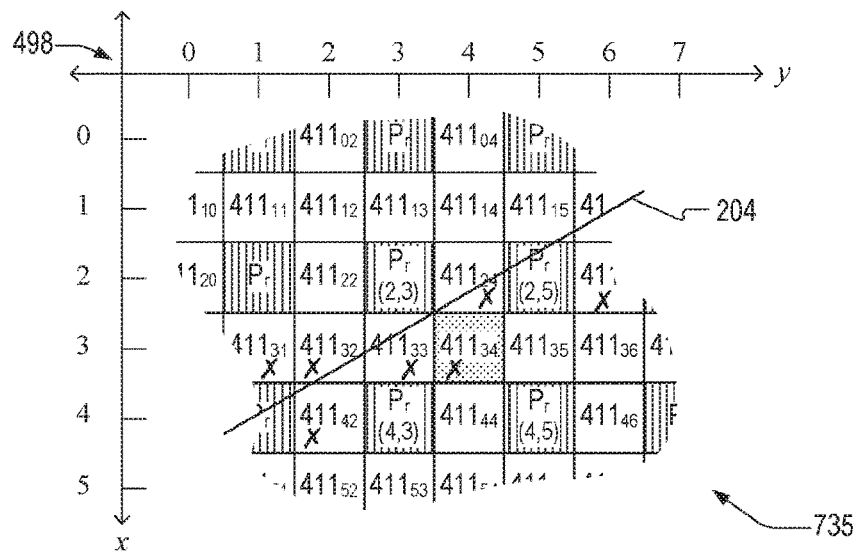
FIGS. 7, 8, and 9 depict example thresholded mappings of the red, green, and the blue confidence map of FIGS. 4, 5, and 6, respectively.
Figure 8:
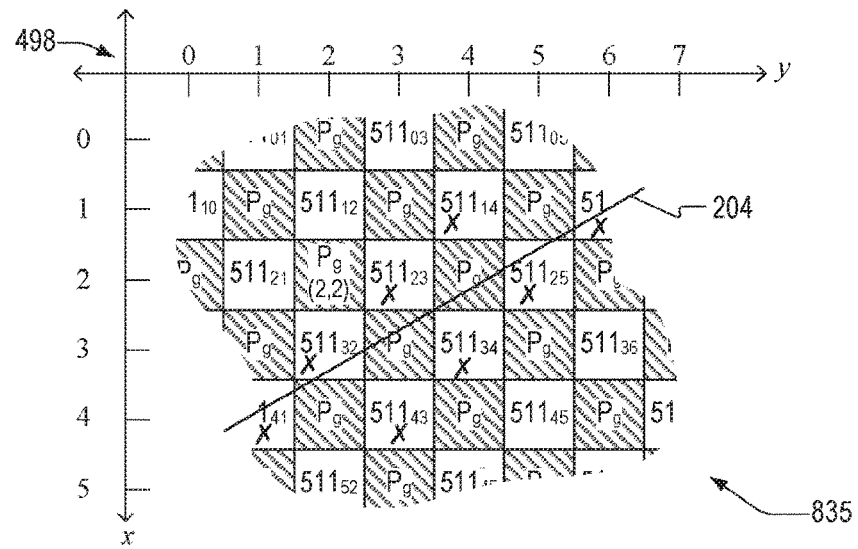
Figure 9:
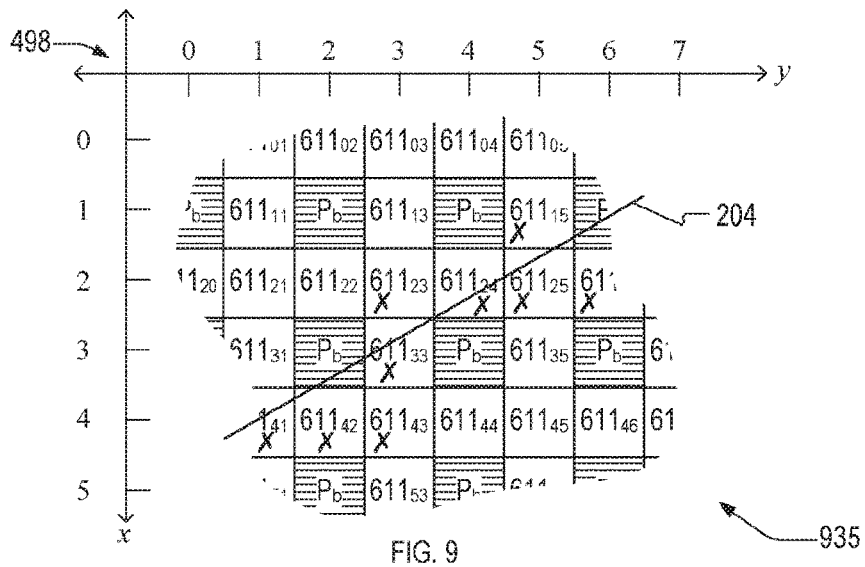

Image demosaicer 300 may implement thresholder 325 to compare each confidence value of confidence maps 410, 510, and 610 to confidence threshold 312. Such a comparison results, for example, in thresholded mappings 735, 835, and 935 of FIGS. 7, 8, and 9, respectively. Thresholded mappings 735, 835, and 935 are examples of thresholded mapping 335(1), 335(2), and 335(3), respectively. Confidence threshold 312 is, for example, a decreasing function of a relative difference or standard deviation of primary pixel-values, such that confidence value monotonically increases as either the relative difference or standard deviation decreases.

Thresholded mappings 735, 835, and 935 are, respectively, confidence maps 410, 510, and 610 with removal of confidence values 411, 511, and 611 that are less than confidence threshold 312. Confidence values 411, 511, and 611 that are less than confidence threshold 312 are those corresponding to pixels located near imaged-edge 204, and are marked with an x-mark ( ✗ ) in FIGS. 7-9. For example, confidence value $411_{33}$ is likely to be less than confidence threshold 312 because the interpolated red pixel-value at coordinate (3,3) is computed from primary pixel-values $P_r(2,3)$ and $P_r(4,3)$ (at respective coordinates (2,3) and (4,3)), which are on opposite sides of imaged-edge 204, and hence have pixel-values that differ significantly. For similar reasons, other confidence values $411_{ij}$ in shaded regions are also likely to be less than confidence threshold 312, depending on the specific value of confidence threshold 312. For example, confidence value $411_{35}$ may be determined as a relative difference between primary pixel-values $P_r(2,5)$ and $P_r(4,5)$. Since the sensor pixel at coordinate (2,5) is mostly on the same side as the sensor pixel at coordinate (4,5), the respective pixel-values may be sufficiently close such that confidence value $411_{35}$ exceeds confidence threshold 312.

Figure 10:
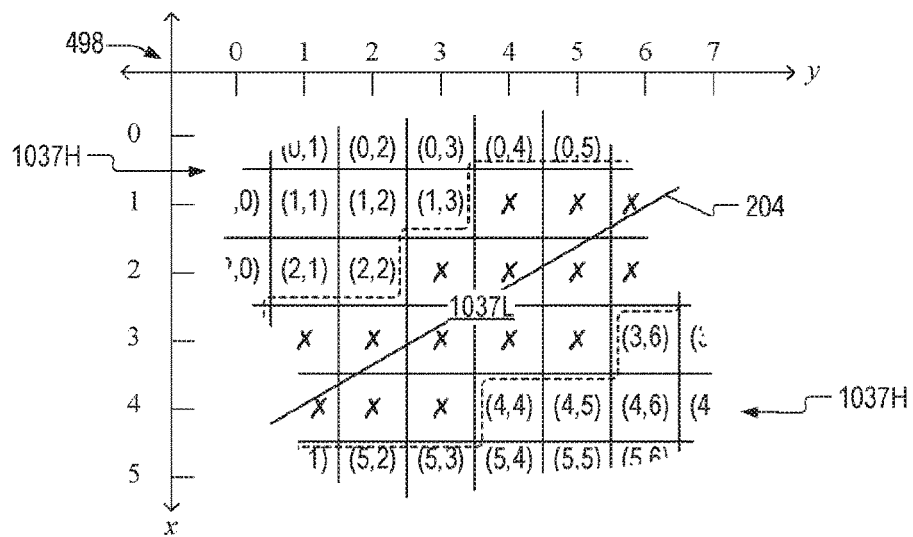
FIG. 10 illustrates examples of high-confidence array-coordinates that are, collectively, an example of high-confidence array-coordinates generated by the image demosaicer of FIG. 3.

FIG. 10 illustrates high-confidence array-coordinates 1037H, which are an example of high-confidence array-coordinates 337H generated by conjunction operator 327 of image demosaicer 300. High-confidence array-coordinates 1037H include those coordinates marked with ordered pairs, and does not include low-confidence array-coordinates 1037L, marked with ✗, which are examples of low-confidence array-coordinates 337L.

A coordinate of thresholded mappings 735, 835, and 935 qualifies for inclusion in high-confidence array-coordinates 1037H only if, for each of thresholded mappings 735, 835, and 935, either (a) the coordinate's confidence value exceeds confidence threshold 312 or (b) the coordinate corresponds to a primary pixel-value. Otherwise, the coordinate is one of low-confidence array-coordinates 1037L, e.g., those marked with ✗ in FIG. 10. For example, high-confidence array-coordinates 1037H include coordinate (2,2) because confidence values $411_{22}$ and $611_{22}$ exceed confidence threshold 312 and coordinate (2,2) corresponds to a primary pixel-value $P_g(2,2)$.

A high-confidence coordinate may be an isolated high-confidence array coordinate, e.g., one having no immediate neighboring high-confidence coordinates 1037H and/or being completely surrounded by low-confidence array coordinates. An isolated high-confidence coordinate may be reassigned or designated, e.g., by conjunction operator 327, as a low-confidence array-coordinate 1037L. Examples of an immediate neighboring coordinate include at least of a side-adjacent coordinate and a corner-adjacent coordinate.

Figure 11:
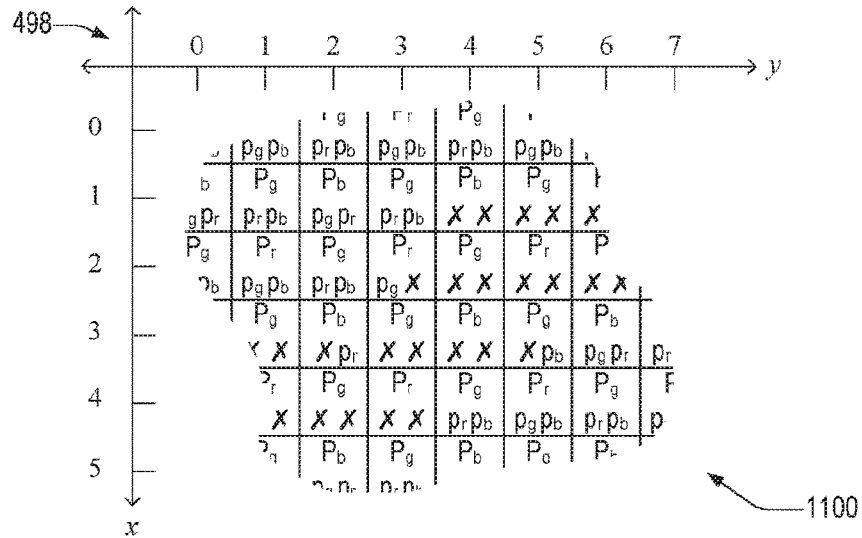
FIG. 11 illustrates an example refined image generated from the color channels of FIGS. 2B-2D and the high-confidence array-coordinates of FIG. 10, in an embodiment.

FIG. 11 illustrates a refined image 1100, which is an example of refined image 338 generated by image generator 328 of image demosaicer 300 from high-confidence array-coordinates 1037H and channels 210, 220, and 230. Refined image 1100 is demosaiced image 240, FIG. 2, after removal of interpolated pixel-values corresponding to low-confidence array-coordinates 1037L. Removed interpolated pixel-values are designated by an ✗. Low-confidence array-coordinates 1037L with two ✗ marks have only one high-confidence pixel-value. Low-confidence array-coordinates 1037L marked just one ✗ mark include two high-confidence pixel-values: one primary pixel-value $P_\alpha$ and one non-primary pixel-value $p_\alpha$. Examples of such low-confidence array-coordinates 1037L with two high-confidence pixel-values include coordinates (2,3), (3,2), and (3,5).

Figure 12:
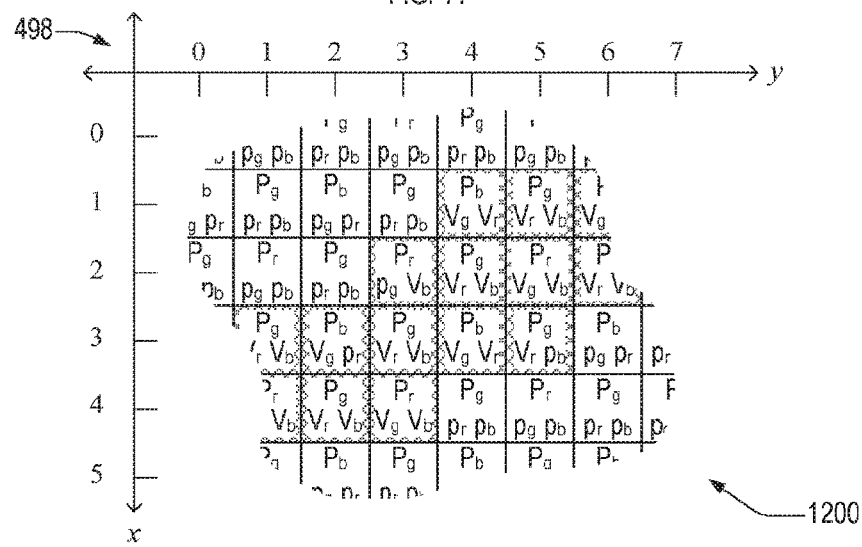
FIG. 12 depicts an example of an output image generated from the refined image of FIG. 11 by the image demosaicer of FIG. 3, in an embodiment.

FIG. 12 illustrates a demosaiced image 1200, which is example of demosaiced image 339 generated by image filler 329 of image demosaicer 300. Demosaiced image 1200 is refined image 1100 with the addition of assigned pixel-values $V_\alpha$ at low-confidence array-coordinates 1037L. In the following discussion, $(x_1,y_1)$ denotes the low-confidence array coordinate, which is also referred to as a target coordinate. Target coordinate $(x_1,y_1)$ has an associated primary pixel-value $P_\alpha(x_1,y_1)$ and may also have a non-primary pixel-value $p_\alpha(x_1,y_1)$. Hereinafter, high-confidence target coordinate $P_\alpha(x_1,y_1)$ denotes either $P_\alpha(x_1,y_1)$ or $p_\alpha(x_1,y_1)$. Subscript $\alpha$ denotes one of r, g, and b, and assigned pixel-values $V_r$, $V_g$, and $V_b$ are red, green, and blue pixel-values respectively.

Image filler 329 may employ weight function 319 to compute assigned pixel-value $V_\alpha$ from neighboring high-confidence pixel-values: primary pixel-values $P_\alpha$ and/or neighboring non-primary pixel-values $p_\alpha$. Herein, a target pixel's neighboring pixel-values are also referred to as source pixel-values corresponding to source coordinates (x, y). Hereinafter, $P_\alpha(x,y)$ denotes either primary pixel-value $P_\alpha(x,y)$ or non-primary pixel-value $p_\alpha(x,y)$. Weight function 319, herein also referred to as weight $w_\alpha(x, y)$, may produce a weighted average of neighboring pixel-values within a radius R of a target pixel. Weight $w_\alpha(x, y)$ may be a combination of a proximity metric $\Pi(x, y)$ and similarity metric $\sigma_\alpha(x, y)$. For example, weight $w_\alpha(x, y)$ is a product or linear combination of proximity metric $\Pi(x, y)$ and similarity metric $\sigma_\alpha(x, y)$.

In an embodiment, for a target pixel located at target coordinate $(x_1,y_1)$, an assigned pixel-value $V_\alpha(x_1,y_1)$ is a weighted average of neighboring high-confidence pixel-values $P_\alpha(x,y)$ ($P_\alpha(x,y)$ and/or $p_\alpha(x, y)$) where each neighboring pixel-value is weighted by weight $w_\alpha(x, y)$ and $(x,y) \neq (x_1,y_1)$. Note that, for a given color a, only one of a primary pixel-value $P_\alpha(x,y)$ and an interpolated pixel-value $p_\alpha(x, y)$ is associated with a given coordinate (x,y). Assigned pixel-value $V_\alpha(x_1,y_1)$ may be expressed as $V_\alpha(x_1, y_1) = \Sigma_{xy} w_\alpha(x, y) P_\alpha(x, y)$, where $w_\alpha(x, y)$ may equal $\Pi_\alpha(x, y)\sigma_\alpha(x, y)$.

Proximity metric $\Pi(x, y)$ may be expressed as a monotonically decreasing function of distance d, where distance $d = \sqrt{(x-x_1)^2+(y-y_1)^2}$ is the distance between source coordinates (x,y) and target coordinates $(x_1,y_1)$. For example, $\Pi(x, y) = \exp(-d^2/(2\rho^2))$, where $\rho = R/r_0$. Constant $r_0$ may be chosen such that proximity metric $\Pi(x, y)$ is between 0.20, and 0.25 when d=R. Radius R is, for example, seven sensor-pixel widths and $r_0 = 1.3 \pm 0.1$. Proximity metric $\Pi(d)$ may equal zero for d>R.

Similarity metric $\sigma_\alpha(x, y)$ may decrease as a function of an increasing relative difference between a primary pixel-value $P_\alpha(x_1,y_1)$ at target coordinate $(x_1,y_1)$ and the same-color pixel-value $P_\alpha(x,y)$ (either pixel-value $p_\alpha(x,y)$ or primary pixel-value $P_\alpha(x,y)$, depending on (x, y)) at the source coordinate (x,y). For example, a similarity metric may be expressed by $\sigma_\alpha(x, y) = c_1/(c_1 + \Delta^m)$, where $\Delta^m > 0$. Difference $\Delta$ is, for example, a relative difference between source pixel-value $P_\alpha(x,y)$ and a high-confidence target pixel-value, e.g., primary pixel-value $P_\alpha(x_1,y_1)$ or, when applicable, non-primary pixel-value $p_\alpha(x_1,y_1)$. The ratio of constant $c_1$ to a maximum value of proximity metric $\Pi(x, y)$ is, for example, $0.02 \pm 0.01$. Exponent m equals two, for example.

To match brightness of an assigned pixel-value $V_\alpha$ with its neighboring pixel-values ($P_\alpha$, $p_\alpha$), image filler 329 may implement scaling function 318 to scale assigned pixel-value $V_\alpha$ by a scaling factor $\kappa$. That is, $V_\alpha(x_1, y_1) = \Sigma_{x,y} \kappa(x, y) w_\alpha(x, y) P_\alpha(x, y)$. A first example of scaling factor $\kappa$ applies to an assigned pixel-value $V_\alpha$ corresponding to a low-confidence array coordinate $(x_1,y_1)$ with just one high-confidence pixel-value $P_\alpha(x_1, y_1) = P_\alpha(x_1, y_1)$. In such a case, the scaling factor $\kappa$ at a source coordinate (x,y) is the ratio of the target pixel's high-confidence pixel-value (at $(x_1,y_1)$) to the same-color pixel-value at the source pixel (at (x, y)). For example, at $x_1 = 2$ and $y_1 = 4$ in FIG. 11, the high-confidence pixel-value is $P_r(2,4)$ (red). At $(x_1, y_1) = (2,4)$, scaling factor $\kappa(x, y)$ may be expressed as $\kappa(x, y) = (P_r(2, 4) + c_\kappa)/(P_r(x,y) + c_\kappa)$.

Constant $c_\kappa$ prevents scaling factor $\kappa$ from having extremely large or small values as a result one or both of $P_r(2,4)$ and $P_r(x, y)$ being near the noise floor of primary pixel-values 311, in which case the ratio $P_r(2,4)$ and $P_r(x, y)$ is not meaningful for determining assigned pixel-values $V_r$, $V_g$, and $V_b$. For pixel-values having a bit depth equal to sixteen, where the maximum pixel-values are $2^{16}$ constant $c_\kappa$ may be in the range of $2^2$ to $2^4$, $c_\kappa=10$, for example. In general, constant $c_\kappa$ may exceed the noise floor of primary pixel-values 311 and be less than ten times the noise floor. Alternatively, constant $c_\kappa$ may equal zero.

A second example of scaling factor κ applies to an assigned pixel-value $V_\alpha$ corresponding to a target low-confidence array coordinate $(x_1,y_1)$ with two high-confidence pixel-values, e.g., a first and a second high-confidence pixel-value. In such a case, the scaling factor κ at a source coordinate (x,y) is a sum of (a) a ratio of the first high-confidence pixel-value to the same-color pixel-value at the source pixel and (b) a ratio of the second high-confidence pixel-value to the same-color pixel-value at the source pixel. For example, at $x_1=2$ and $y_1=3$ in FIG. 11, the high-confidence pixel-values are $P_r(2,3)$ (red) and $p_g(2,3)$. At $(x_1, y_1)=(2,3)$, scaling factor κ(x, y) at source coordinate (x,y) is an average of two ratios: $P_r(2,3)$ to $P_r(x, y)$ and $p_g(2,3)$ to $P_g(x, y)$. For example, $$\kappa(x, y) = 0.5\left(\frac{P_r(2, 3) + c_k}{\mathcal{P}_r(x, y) + c_k} + \frac{p_g(2, 3) + c_k}{\mathcal{P}_g(x, y) + c_k}\right).$$

Whether assigned pixel-value $V_\alpha(x_1,y_1)$ is a weighted average of neighboring pixel-values may depend a sum Σ of weights $w_\alpha(x, y)$ exceeding a predetermined threshold τ, which is example of weight threshold 319T. For example, when R=7±1, threshold τ=0.2±0.1. The sum of weights $w_\alpha(x, y)$ may be computed, e.g., by image filler 329, for all values of d, or be limited to d≤R.

In a first embodiment, when sum Σ does not exceed threshold τ, image filler 329 may set assigned pixel-value $V_\alpha(x_1,y_1)$ to equal to the primary pixel-value at $(x_1,y_1)$. For example, at coordinate (4,2) in demosaiced image 1200, the primary pixel-value is $P_g(4,2)$. If sum Σ of weights $w_r(x, y)$ and/or $w_b(x, y)$ does not exceed threshold τ, then image filler 329 may set $V_r(4,2)$ and/or $V_b(4,2)$ to equal $P_g(4,2)$. Setting both values of $V_r(4,2)$ and $V_b(4,2)$ in this way contributes to demosaiced image 1200 having a neutral color (e.g., a shade of gray) at coordinate (4,2), and hence avoids introducing the aforementioned color artifacts at imaged edges. The following two embodiments include alternative means of avoiding said artifacts.

In a second embodiment, when sum Σ does not exceed threshold τ, and target array-coordinate $(x_1,y_1)$ has a high-confidence pixel-value $P_\beta(x_1,y_1)$, where β is first color channel of raw image 194, image filler 329 may determine assigned pixel-value $V_\alpha(x_1,y_1)$ as equal to a high-confidence pixel-value $P_\alpha(x_s, y_s)$, where $P_\beta(x_s, y_s)$ is closest to $P_\beta(x_1,y_1)$ of all source array-coordinates (x, y) within a predetermined distance, e.g., radius R, from target array-coordinate $(x_1,y_1)$. In this example, α is a second color channel of raw image 194 differing from the first channel corresponding to β.

In a third embodiment, when sum Σ does not exceed threshold τ, image filler 329 may determine assigned pixel-value $V_\alpha(x_1,y_1)$ according to a neutral source pixel-value $P_\alpha(x_n, y_n)$. Neutral array-coordinate $(x_n, y_n)$ corresponds to the high-confidence array-coordinate (x,y) within a predetermined distance, e.g., radius R, of the target array-coordinate $(x_1,y_1)$ that has the most neutral pixel-value. Neutral pixel-values may correspond to a shade of gray. When pixel-value triplet $P_{r,g,b}(x, y)$ satisfies the metric, image filler 329 may deem it "neutral." Image filler 329 may determine a plurality of pixel-value triplets $P_{r,g,b}(x,y)$ as sufficiently neutral, and determine neutral source pixel-value $P_\alpha(x_n, y_n)$ as the one of the plurality of pixel-value triplets most proximate to target array-coordinate $(x_1,y_1)$. To match brightness of the high-confidence target pixel-value, scaling function 318 may scale neutral source pixel-value $P_\alpha(x_n, y_n)$ according to the known primary pixel-value at target array-coordinate $(x_1,y_1)$.

For example, at coordinate (4,2) in demosaiced image 1200, the primary pixel-value is $P_g(4,2)$, and the most neutral neighboring pixel may be at array-coordinate (4,4). If sum Σ of weights $w_r(x, y)$ and/or $w_b(x, y)$ does not exceed threshold τ, then image filler 329 may set $V_r(4,2)$ equal to $p_r(4,4)$ multiplied by scaling factor $\kappa_g=(P_g(4,2)+c_k)/(P_g(4,4)+c_k)$ and $V_b(4,2)$ equal to $p_b(4,4)$ multiplied by scaling factor $\kappa_b=(P_b(4,2)+c_k)/(P_b(4,4)+c_k)$.

Embodiments disclosed herein may employ one or more metrics for quantifying the neutrality of a pixel-value. For example, a metric for pixel-value neutrality at coordinate (x,y) includes standard deviation or variance of the average of three pixel-values $P_{r,g,b}(x,y)$. A metric may include saturation of $P_{r,g,b}(x, y)$, where neutrality is inversely correlated to saturation. Saturation is as expressed, for example, by a quantity $(1-\min(P_r, P_g, P_b)/Y)$, where relative luminance $Y=(c_r P_r+c_g P_g+c_b P_b)$, and $c_r+c_g+c_b=1$. Coefficients $c_r$, $c_g$, and $c_b$ are respectively, 0.3, 0.6, and 0.1, for example. Saturation may also be quantified from a pixel-value triplet $P_{r,g,b}(x, y)$, according to definitions of saturation of a color space, such as HSL or HSV.

Figure 13:
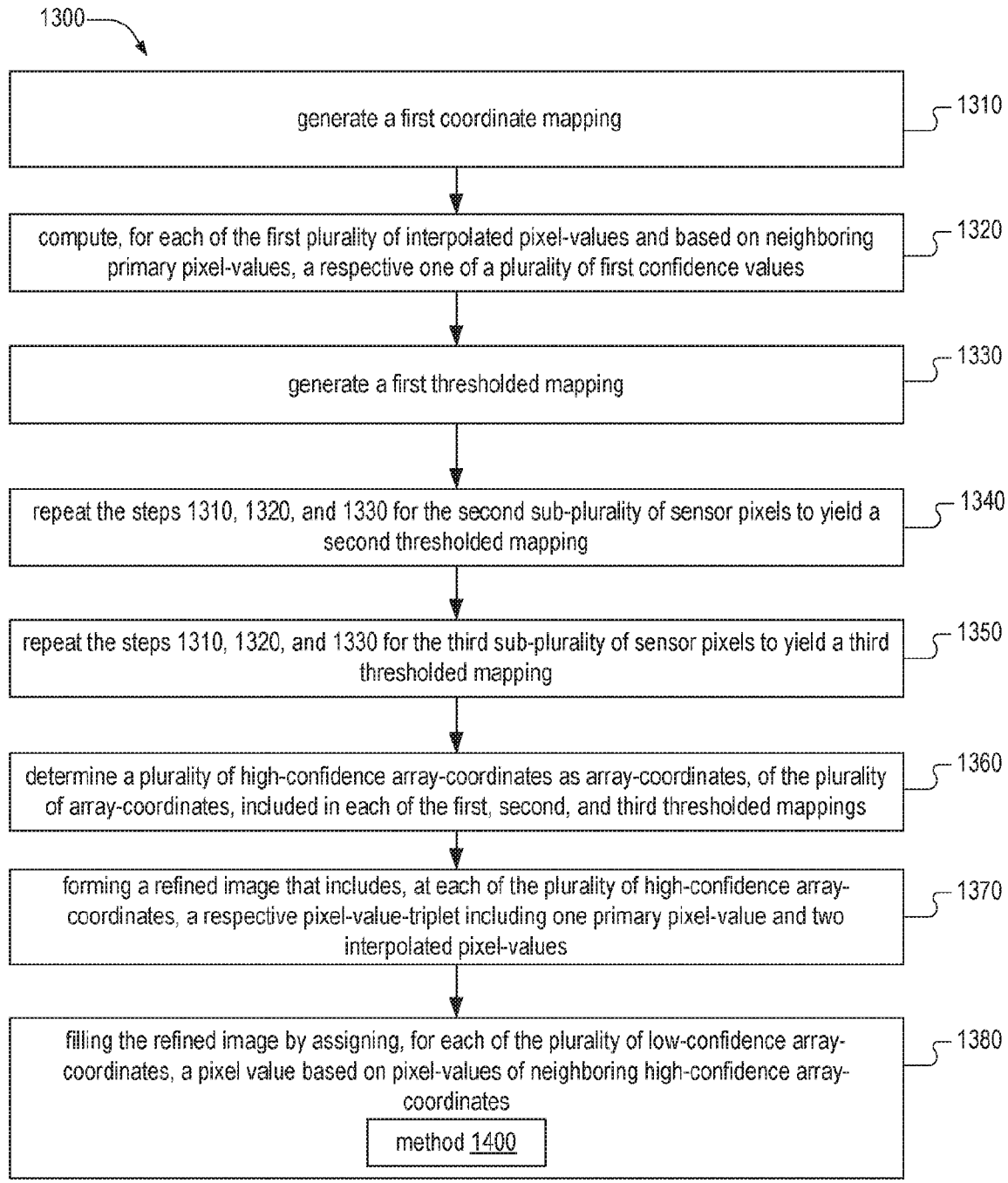
FIG. 13 is a flowchart illustrating a method for demosaicing an image captured by an image sensor, in an embodiment.

FIG. 13 is a flowchart illustrating a method 1300 for demosaicing an image captured by an image sensor. The image sensor includes an arrayed plurality of sensor pixels each located at a respective one of a plurality of array-coordinates. The plurality of sensor pixels includes (i) at a first sub-plurality of array-coordinates, a first sub-plurality of sensor pixels each filtered by a respective first color filter, (ii) at a second sub-plurality of array-coordinates, a second sub-plurality of sensor pixels filtered by a respective second color filter, and (iii) at a third sub-plurality of array-coordinates, a third sub-plurality of sensor pixels filtered by a respective third color filter.

Method 1300 is, for example, implemented within one or more aspects of image demosaicer 300. For example, method 1300 is implemented by microprocessor 302 executing computer-readable instructions of software 320. Method 1300 includes at least one of steps 1310, 1320, 1330, 1340, 1350, 1360, 1370, and 1380.

Step 1310 includes generating a first coordinate mapping including each of the second and third plurality of array-coordinates mapped to a respective one of a first plurality of interpolated pixel-values interpolated from neighboring primary pixel-values. The neighboring primary pixel-values are a sub-plurality of a first plurality of primary pixel-values generated by the first sub-plurality of sensor pixels. In an example of step 1310, interpolator 321 generates, from primary pixel-values 311(1), coordinate mapping 331(1), which includes interpolated pixel-values 332(1). Red channel 210, FIG. 2B, is example of coordinate mapping 331(1).

Step 1320 includes computing, for each of the first plurality of interpolated pixel-values and based on neighboring primary pixel-values, a respective one of a plurality of first confidence values. Each of the plurality of first confidence values corresponds to an array-coordinate of either the second or third plurality of array-coordinates. In an example of step 1320, confidence assessor 323 computes confidence values 333(1) from interpolated pixel-values 332(1) and neighboring pixel-values of primary pixel-values 311(1). Confidence values 411, FIG. 4, are examples of confidence values 333(1).

Step 1330 includes generating a first thresholded mapping from the first coordinate mapping by removing each interpolated pixel-value, and array-coordinate mapped thereto, having a first confidence value less than a threshold value. In an example of step 1330, thresholder 325 generates thresholded mapping 335(1), of which thresholded mapping 735 is an example, FIG. 7.

Step 1340 includes repeating the steps 1310, 1320, and 1330 for the second sub-plurality of sensor pixels to yield a second thresholded mapping. In an example of step 1310, as executed within step 1340, interpolator 321 generates, from primary pixel-values 311(2), coordinate mapping 331(2), which includes interpolated pixel-values 332(2). Green channel 220, FIG. 2C, is an example of coordinate mapping 331(2). In an example of step 1320, as executed within step 1340, confidence assessor 323 computes confidence values 333(2) from interpolated pixel-values 332(2) and neighboring pixel-values of primary pixel-values 311(2). Confidence values 511, FIG. 5, are examples of confidence values 333(2). In an example of step 1330, as executed within step 1340, thresholder 325 generates thresholded mapping 335(2), of which thresholded mapping 835 is an example, FIG. 8.

Step 1350 includes repeating the steps 1310, 1320, and 1330 for the second sub-plurality of sensor pixels to yield a third thresholded mapping. In an example of step 1310, as executed within step 1350, interpolator 321 generates, from primary pixel-values 311(3), coordinate mapping 331(3), which includes interpolated pixel-values 332(3). Blue channel 230, FIG. 2D, is an example of coordinate mapping 331(3). In an example of step 1320, as executed within step 1340, confidence assessor 323 computes confidence values 333(3) from interpolated pixel-values 332(3) and neighboring pixel-values of primary pixel-values 311(3). Confidence values 611, FIG. 6, are examples of confidence values 333(3). In an example of step 1330, as executed within step 1340, thresholder 325 generates thresholded mapping 335(3), of which thresholded mapping 935 is an example, FIG. 9.

Step 1360 includes determining a plurality of high-confidence array-coordinates as array-coordinates, of the plurality of array-coordinates, included in each of the first, second, and third thresholded mappings. The remaining array-coordinates, of the plurality of array-coordinates, not determined as high-confidence array-coordinates, are a plurality of low-confidence array-coordinates. In an example of step 1360, conjunction operator 327 determines high-confidence array-coordinates 337H from array-coordinates of coordinate mappings 331 included in each of thresholded mappings 335. The remaining coordinates are low-confidence array-coordinates 337L. High-confidence array-coordinates 1037H and low-confidence array-coordinates 1037L, FIG. 10, are respective examples of high-confidence array-coordinates 337H and low-confidence array-coordinates 337L.

Step 1370 includes forming a refined image that includes, at each of the plurality of high-confidence array-coordinates, a respective pixel-value-triplet including one primary pixel-value and two interpolated pixel-values. In an example of step 1370, image generator 328 forms refined image 338, of which refined image 1100, FIG. 11, is an example.

Step 1380 includes filling the refined image by assigning, for each of the plurality of low-confidence array-coordinates, a pixel-value based on pixel-values of neighboring high-confidence array-coordinates. In an example of step 1380, image filler 329 fills refined image 338 to yield demosaiced image 339, of which demosaiced image 1200 is an example. Demosaiced image 1200 includes assigned pixel-values $V_\alpha$ at low-confidence array-coordinates 1037L.

Figure 14:
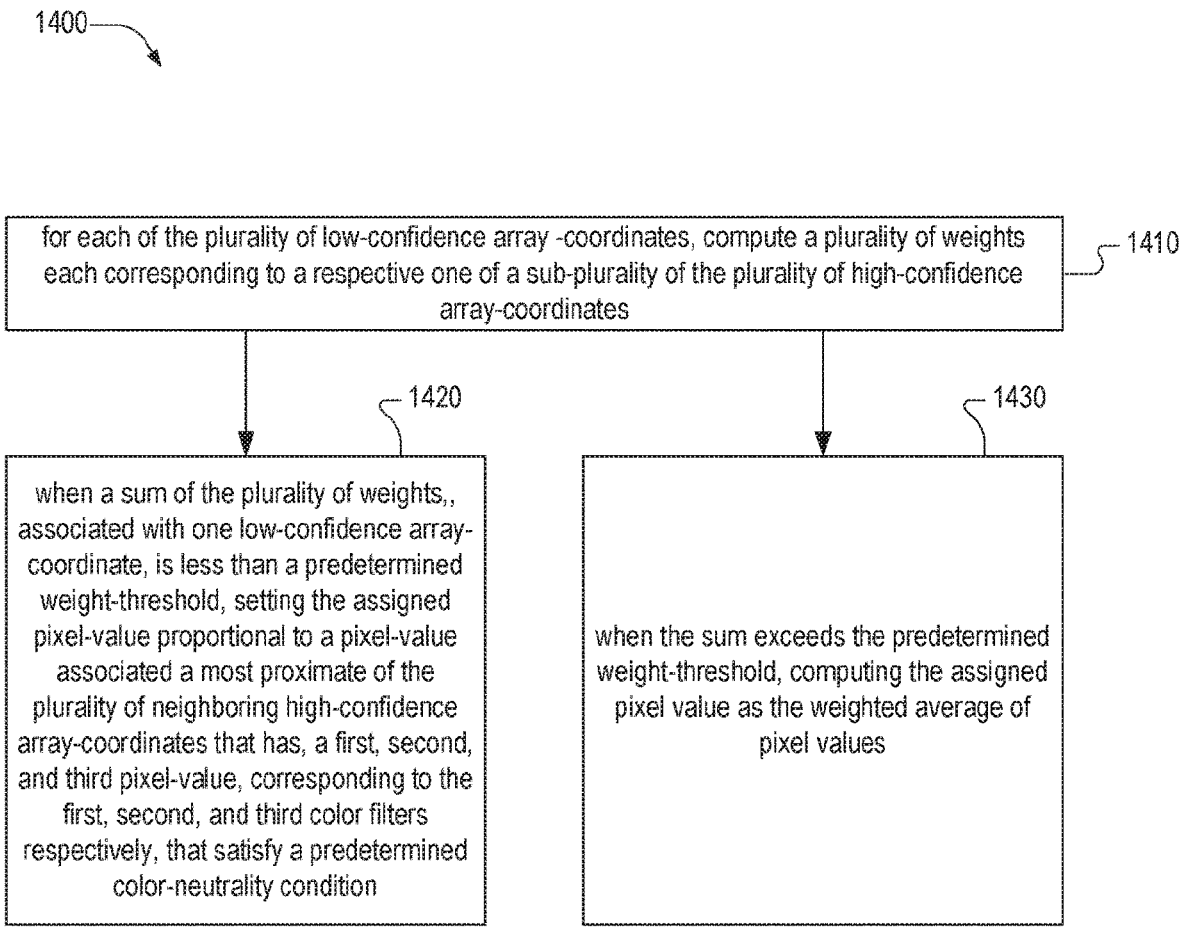
FIG. 14 is a flowchart illustrating a method for filling the refined image formed by the method of FIG. 13, in an embodiment.

FIG. 14 is a flowchart illustrating a method 1400 for filling the refined image formed by step 1370 of method 1300. Step 1380 may implement method 1400, which includes step 1410 and at least one of steps 1420 and 1430.

Step 1410 includes, for each of the plurality of low-confidence array-coordinates, computing a plurality of weights each corresponding to a respective one of a sub-plurality of the plurality of high-confidence array-coordinates. Each of the plurality of weights is determined by at least one of (i) a distance between the high-confidence array-coordinates and the low-confidence array-coordinate and (ii) similarity of pixel-values of neighboring high-confidence array-coordinates to the low-confidence array-coordinate's associated primary pixel-value. In an example of step 1410, for each low-confidence array-coordinate 1037L, FIG. 10, image filler 329 computes weights $w_\alpha(x, y)$.

Step 1420 includes, when a sum of the plurality of weights, associated with one low-confidence array-coordinate, is less than a predetermined weight-threshold, setting the assigned pixel-value proportional to a pixel-value associated a most proximate of the plurality of neighboring high-confidence array-coordinates that has, a first, second, and third pixel-value, corresponding to the first, second, and third color filters respectively, that satisfy a color-neutrality condition. In an example of step 1420, image filler 329 sets $V_r(4,2)$ equal to $p_r(4,4)$ multiplied by scaling factor $\kappa_g = (P_g(4,2)+c_k)/(P_g(4,4)+c_k)$ and $V_b(4,2)$ equal to $p_b(4,4)$ multiplied by scaling factor $\kappa_b = (P_b(4,2)+c_k)/(P_b(4,4)+c_k)$.

Step 1430 includes, when the sum of the plurality of weights, associated with one low-confidence array-coordinate, exceeds the predetermined weight-threshold, computing the assigned pixel-value as the weighted average of pixel-values. In an example of step 1430, image filler 329 computes assigned pixel-value $V_\alpha(x_1,y_1)$ of demosaiced image 1200, FIG. 12.

Combinations of Features

Features described above as well as those claimed below may be combined in various ways without departing from the scope hereof. The following examples illustrate some possible, non-limiting combinations:

(A1) denotes a method for demosaicing an image captured by an image sensor. The image sensor has an arrayed plurality of sensor pixels each located at a respective one of a plurality of array-coordinates. The plurality of sensor pixels includes (i) at a first sub-plurality of array-coordinates, a first sub-plurality of sensor pixels each filtered by a respective first color filter, (ii) at a second sub-plurality of array-coordinates, a second sub-plurality of sensor pixels filtered by a respective second color filter, and (iii) at a third sub-plurality of array-coordinates, a third sub-plurality of sensor pixels filtered by a respective third color filter. The method includes steps of computing, generating, determining, forming, and filling.

The step of computing includes computing, for each of a first plurality of interpolated pixel-values and based on neighboring primary pixel-values, a respective one of a plurality of first confidence values each corresponding to an array-coordinate of either the second or the third plurality of array-coordinates. The first plurality of interpolated pixel-values is interpolated from neighboring primary pixel-values, of a first plurality of primary pixel-values, generated by the first sub-plurality of sensor pixels.

The step of generating includes generating a first thresholded mapping from a first coordinate mapping by removing each interpolated pixel-value, and array-coordinate mapped thereto, having a first confidence value less than a threshold value. The first coordinate mapping includes each of the second and the third plurality of array-coordinates mapped to a respective one of a first plurality of interpolated pixel-values.

The method also includes repeating the steps of computing and generating for the second sub-plurality of sensor pixels to yield a second thresholded mapping. The method also includes repeating the steps of computing and generating for the third sub-plurality of sensor pixels to yield a third thresholded mapping.

The step of determining includes determining a plurality of high-confidence array-coordinates as array-coordinates, of the plurality of array-coordinates, included in each of the first, second, and third thresholded mappings, remaining array-coordinates being a plurality of low-confidence array-coordinates. The step of forming includes forming a refined image that includes, at each of the plurality of high-confidence array-coordinates, a respective pixel-value-triplet including one primary pixel-value and two interpolated pixel-values. The step of filling includes filling the refined image by assigning, for each of the plurality of low-confidence array-coordinates, a pixel-value based on pixel-values of neighboring high-confidence array-coordinates.

(A2) In the method denoted (A1), wherein each of the plurality of low-confidence array-coordinates has an associated primary pixel-value of one of the first, second, and third coordinate mapping, the step of filling may include, for each of the plurality of low-confidence array-coordinates proximate a sub-plurality of the plurality of high-confidence array-coordinates: (a) computing a plurality of weights each corresponding to a respective one of a sub-plurality of high-confidence array-coordinates, each of the plurality of weights being determined by at least one of (i) a distance between the high-confidence array-coordinates and the low-confidence array-coordinate and (ii) a difference between of pixel-values of neighboring high-confidence array-coordinates to the low-confidence array-coordinate's associated primary pixel-value; and (b) when the sum exceeds a predetermined weight-threshold, computing the assigned pixel-value as an average of each pixel-value, of the sub-plurality of high-confidence array-coordinates, multiplied by its corresponding one of the plurality of weights.

(A3) In the method denoted (A2) in the step of computing the plurality of weights, each of the plurality of weights may be a function of a proximity metric that is a monotonically decreasing function of the distance.

(A4) In any method denoted by one of (A2) and (A3), in the step of computing the plurality of weights, each of the plurality of weights may be a function of a similarity metric that is a monotonically decreasing function of the difference.

(A5) In any method denoted by one of (A1) through (A4), in the step of computing, each of the plurality of first confidence values may be based on at least one of a relative difference and a standard deviation of the neighboring primary-pixel-values.

(A6) Any method denoted by one of (A1) through (A5) may further include generating the first coordinate mapping.

(A7) Any method denoted by one of (A1) through (A6) may further include, when the plurality of high-confidence array-coordinates includes an isolated high-confidence array-coordinate completely surrounded by low-confidence array-coordinates, designating the isolated high-confidence array-coordinate as a low-confidence array-coordinate.

(A8) Any method denoted by one of (A1) through (A7), may further include, when the low-confidence array-coordinate's primary pixel-value is associated with the first color filter: (a) computing a plurality of scaling factors each corresponding to a respective one of the sub-plurality of high-confidence array-coordinates, each of the plurality of scaling factors being proportional to a ratio of the low-confidence array-coordinate's primary pixel-value to the pixel-value at the high-confidence array-coordinate associated with the first color filter; and (b) when the sum exceeds the predetermined weight-threshold, computing the assigned pixel-value as an average of each pixel-value, of the sub-plurality of high-confidence array-coordinates, multiplied by its corresponding one of the plurality of weights and its corresponding one of the plurality of scaling factors.

(A9) Any method denoted by one of (A1) through (A8) may further include, when the sum of the plurality of weights is less than the predetermined weight-threshold, setting the assigned pixel-value proportional to a pixel-value associated a most proximate of the plurality of neighboring high-confidence array-coordinates that has a first, second, and third pixel-value, corresponding to the first, second, and third color filters respectively, that satisfy a color-neutrality condition.

(A10) Any method denoted by one of (A1) through (A9), when each of the plurality of sensor pixels has a pixel charge corresponding to a respective intensity of light from a scene incident thereon, may further include capturing image by: converting, with an analog-to-digital converter, each pixel charge to a respective one of the primary pixel-values; and storing the primary pixel-values in a memory communicatively coupled to a microprocessor configured to execute the steps of generating, computing, determining, forming, and filling.

(B1) An image demosaicer includes a memory and a microprocessor and is configured to process an image captured by an image sensor. The memory stores non-transitory computer-readable instructions and adapted to store the image. The microprocessor adapted to execute the instructions to perform the any of the methods (A1) through (A10).

Changes may be made in the above demosaicing methods and demosaicing systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present demosaicing method and system, which, as a matter of language, might be said to fall therebetween.

Various aspects of the present invention may be appreciated from the following enumerated example embodiments (EEEs):

1. A method for demosaicing an image captured by an image sensor having an arrayed plurality of sensor pixels each located at a respective one of a plurality of array-coordinates, the plurality of sensor pixels including (i) at a first sub-plurality of array-coordinates, a first sub-plurality of sensor pixels each filtered by a respective first color filter, (ii) at a second sub-plurality of array-coordinates, a second sub-plurality of sensor pixels filtered by a respective second color filter, and (iii) at a third sub-plurality of array-coordinates, a third sub-plurality of sensor pixels filtered by a respective third color filter, the method comprising:
   computing, for each of a first plurality of interpolated pixel-values and based on neighboring primary pixel-values, a respective one of a plurality of first confidence values each corresponding to an array-coordinate of either the second or the third plurality of array-coordinates, the first plurality of interpolated pixel-values being interpolated from neighboring primary pixel-values, of a first plurality of primary pixel-values, generated by the first sub-plurality of sensor pixels;

generating a first thresholded mapping from a first coordinate mapping by removing each interpolated pixel-value, and array-coordinate mapped thereto, having a first confidence value less than a threshold value, the first coordinate mapping including each of the second and the third plurality of array-coordinates mapped to a respective one of a first plurality of interpolated pixel-values;

repeating the steps of computing and generating for the second sub-plurality of sensor pixels to yield a second thresholded mapping;

repeating the steps of computing and generating for the third sub-plurality of sensor pixels to yield a third thresholded mapping;

determining a plurality of high-confidence array-coordinates as array-coordinates, of the plurality of array-coordinates, included in each of the first, second, and third thresholded mappings, remaining array-coordinates being a plurality of low-confidence array-coordinates;

forming a refined image that includes, at each of the plurality of high-confidence array-coordinates, a respective pixel-value-triplet including one primary pixel-value and two interpolated pixel-values; and filling the refined image by assigning, for each of the plurality of low-confidence array-coordinates, a pixel-value based on pixel-values of neighboring high-confidence array-coordinates.

2. The method EEE 1, each of the plurality of low-confidence array-coordinates having an associated primary pixel-value of one of the first, second, and third coordinate mapping, the step of filling comprising, for each of the plurality of low-confidence array-coordinates proximate a sub-plurality of the plurality of high-confidence array-coordinates, computing a plurality of weights each corresponding to a respective one of a sub-plurality of high-confidence array-coordinates, each of the plurality of weights being determined by at least one of (i) a distance between the high-confidence array-coordinates and the low-confidence array-coordinate and (ii) a difference between of pixel-values of neighboring high-confidence array-coordinates to the low-confidence array-coordinate's associated primary pixel-value; and when the sum exceeds a predetermined weight-threshold, computing the assigned pixel-value as an average of each pixel-value, of the sub-plurality of high-confidence array-coordinates, multiplied by its corresponding one of the plurality of weights.

3. The method of EEE 2, in the step of computing the plurality of weights, each of the plurality of weights being a function of a proximity metric that is a monotonically decreasing function of the distance.

4. The method of EEE 2, in the step of computing the plurality of weights, each of the plurality of weights being a function of a similarity metric that is a monotonically decreasing function of the difference.

5. The method EEE 1, in the step of computing, each of the plurality of first confidence values being based on at least one of a relative difference and a standard deviation of the neighboring primary-pixel-values.

6. The method EEE 1, further comprising generating the first coordinate mapping.

7. The method EEE 1, further comprising, when the plurality of high-confidence array-coordinates includes an isolated high-confidence array-coordinate completely surrounded by low-confidence array-coordinates, designating the isolated high-confidence array-coordinate as a low-confidence array-coordinate.

8. The method EEE 2, the low-confidence array-coordinate's primary pixel-value being associated with the first color filter, and further comprising:

computing a plurality of scaling factors each corresponding to a respective one of the sub-plurality of high-confidence array-coordinates, each of the plurality of scaling factors being proportional to a ratio of the low-confidence array-coordinate's primary pixel-value to the pixel-value at the high-confidence array-coordinate associated with the first color filter; and when the sum exceeds the predetermined weight-threshold, computing the assigned pixel-value as an average of each pixel-value, of the sub-plurality of high-confidence array-coordinates, multiplied by its corresponding one of the plurality of weights and its corresponding one of the plurality of scaling factors.

9. The method EEE 2, when the sum of the plurality of weights is less than the predetermined weight-threshold, setting the assigned pixel-value proportional to a pixel-value associated a most proximate of the plurality of neighboring high-confidence array-coordinates that has a first, second, and third pixel-value, corresponding to the first, second, and third color filters respectively, that satisfy a color-neutrality condition.

10. The method EEE 1, each of the plurality of sensor pixels having a pixel charge corresponding to a respective intensity of light from a scene incident thereon, and further comprising capturing image by:

converting, with an analog-to-digital converter, each pixel charge to a respective one of the primary pixel-values; and storing the primary pixel-values in a memory communicatively coupled to a microprocessor configured to execute the steps of generating, computing, determining, forming, and filling.

11. An image demosaicer for processing an image captured by an image sensor having an arrayed plurality of sensor pixels each located at a respective one of a plurality of array-coordinates, the plurality of sensor pixels including (i) at a first sub-plurality of array-coordinates, a first sub-plurality of sensor pixels each filtered by a respective first color filter, (ii) at a second sub-plurality of array-coordinates, a second sub-plurality of sensor pixels filtered by a respective second color filter, and (iii) at a third sub-plurality of array-coordinates, a third sub-plurality of sensor pixels filtered by a respective third color filter, comprising:

a memory storing non-transitory computer-readable instructions and adapted to store the image;

a microprocessor adapted to execute the instructions to:

compute, for each of a first plurality of interpolated pixel-values and based on neighboring primary pixel-values, a respective one of a plurality of first confidence values each corresponding to an array-coordinate of either the second or the third plurality of array-coordinates, the first plurality of interpolated pixel-values being interpolated from neighboring primary pixel-values, of a first plurality of primary pixel-values, generated by the first sub-plurality of sensor pixels;

generate a first thresholded mapping from a first coordinate mapping by removing each interpolated pixel-value, and array-coordinate mapped thereto, having a first confidence value less than a threshold value, the first coordinate mapping including each of the second and the third plurality of array-coordinates mapped to a respective one of a first plurality of interpolated pixel-values;

repeat the steps of computing and generating for the second sub-plurality of sensor pixels to yield a second thresholded mapping;

repeat the steps of computing and generating for the third sub-plurality of sensor pixels to yield a third thresholded mapping;

determine a plurality of high-confidence array-coordinates as array-coordinates, of the plurality of array-coordinates, included in each of the first, second, and third thresholded mappings, the remaining array-coordinates being a plurality of low-confidence array-coordinates;

form a refined image that includes, at each of the plurality of high-confidence array-coordinates, a respective pixel-value-triplet including one primary pixel-value and two interpolated pixel-values; and fill the refined image by assigning, for each of the plurality of low-confidence array-coordinates, a pixel-value based on pixel-values of neighboring high-confidence array-coordinates.

12. The image demosaicer of EEE 11, each of the plurality of low-confidence array-coordinates having an associated primary pixel-value of one of the first, second, and third coordinate mapping, the microprocessor being further configured to, in the step of filling and for each of the plurality of low-confidence array-coordinates proximate a sub-plurality of the plurality of high-confidence array-coordinates, compute a plurality of weights each corresponding to a respective one of a sub-plurality of high-confidence array-coordinates, each of the plurality of weights being determined by at least one of: (i) a distance between the high-confidence array-coordinates and the low-confidence array-coordinate and (ii) similarity of pixel-values of neighboring high-confidence array-coordinates to the low-confidence array-coordinate's associated primary pixel-value; and when the sum exceeds the predetermined weight-threshold, compute the assigned pixel-value as a weighted average of pixel-values of the sub-plurality of high-confidence array-coordinates.

13. The image demosaicer of EEE 11, in the step of computing, each of the plurality of first confidence values being based on at least one of a relative difference and a standard deviation of the neighboring primary-pixel-values.

14. The image demosaicer of EEE 11, each of the plurality of weights being a function of a proximity metric that is a monotonically decreasing function of the distance.

15. The image demosaicer of EEE 11, each of the plurality of weights being a function of a similarity metric that is a monotonically decreasing function of the difference.

16. The image demosaicer of EEE 11, the microprocessor being further adapted to generate the first coordinate mapping.

17. The image demosaicer of EEE 11, the microprocessor being further adapted to, when the plurality of high-confidence array-coordinates includes an isolated high-confidence array-coordinate completely surrounded by low-confidence array-coordinates, designate the isolated high-confidence array-coordinate as a low-confidence array-coordinate.

18. The image demosaicer of EEE 11, the low-confidence array-coordinate's primary pixel-value being associated with the first color filter, and the microprocessor being further adapted to:

compute a plurality of scaling factors each corresponding to a respective one of the sub-plurality of high-confidence array-coordinates, each of the plurality of scaling factors being proportional to a ratio of the low-confidence array-coordinate's primary pixel-value to the pixel-value at the high-confidence array-coordinate associated with the first color filter; and when the sum exceeds the predetermined weight-threshold, compute the assigned pixel-value as an average of each pixel-value, of the sub-plurality of high-confidence array-coordinates, multiplied by its corresponding one of the plurality of weights and its corresponding one of the plurality of scaling factors.

19. The image demosaicer of EEE 11, the microprocessor being further adapted to, when the sum of the plurality of weights is less than the predetermined weight-threshold, set the assigned pixel-value proportional to a pixel-value associated a most proximate of the plurality of neighboring high-confidence array-coordinates that has, a first, second, and third pixel-value, corresponding to the first, second, and third color filters respectively, that satisfy a color-neutrality condition.

20. The image demosaicer of EEE 11, each of the plurality of sensor pixels having a pixel charge corresponding to a respective intensity of light from a scene incident thereon, the microprocessor being further adapted to, when capturing the image:

convert, with an analog-to-digital converter, each pixel charge to a respective one of the primary pixel-values; and store the primary pixel-values in the memory.

21. A computer program product comprising computer readable instructions which, when executed by one or more microprocessors of an image demosaicer, cause the image demosaicer to perform the method of any one of EEEs 1 to 10.

22. A computer-readable medium on which is stored the computer program product of EEE 21.

The invention claimed is:

1. A method for demosaicing an image captured by an image sensor having an arrayed plurality of sensor pixels each located at a respective one of a plurality of array-coordinates, the plurality of sensor pixels including at a first sub-plurality of array-coordinates, a first sub-plurality of sensor pixels each filtered by a respective first color filter, at a second sub-plurality of array-coordinates, a second sub-plurality of sensor pixels filtered by a respective second color filter, and at a third sub-plurality of array-coordinates, a third sub-plurality of sensor pixels filtered by a respective third color filter, the method comprising:

computing, for each of a first plurality of interpolated pixel-values and based on neighboring primary pixel-values, a respective one of a plurality of first confidence values each corresponding to an array-coordinate of either the second or the third sub-plurality of array-coordinates, the first plurality of interpolated pixel-values being interpolated from neighboring primary pixel-values, of a first plurality of primary pixel-values, generated by the first sub-plurality of sensor pixels;

generating a first thresholded mapping from a first coordinate mapping by removing each interpolated pixel-value, and array-coordinate mapped thereto, having a first confidence value less than a threshold value, the first coordinate mapping including each of the second and the third sub-plurality of array-coordinates mapped to a respective one of a first plurality of interpolated pixel-values;

repeating the steps of computing and generating for the second sub-plurality of sensor pixels to yield a second thresholded mapping;

repeating the steps of computing and generating for the third sub-plurality of sensor pixels to yield a third thresholded mapping;

determining a plurality of high-confidence array-coordinates as array-coordinates, of the plurality of array-coordinates, included in each of the first, second, and third thresholded mappings, remaining array-coordinates being a plurality of low-confidence array-coordinates;

forming a refined image that includes, at each of the plurality of high-confidence array-coordinates, a respective pixel-value-triplet including one primary pixel-value and two interpolated pixel-values; and filling the refined image by assigning, for each of the plurality of low-confidence array-coordinates, a pixel-value based on pixel-values of neighboring high-confidence array-coordinates.

2. The method of claim 1, each of the plurality of low-confidence array-coordinates having an associated primary pixel-value of one of the first, second, and third coordinate mapping, the step of filling comprising, for each of the plurality of low-confidence array-coordinates proximate to a sub-plurality of the plurality of high-confidence array-coordinates, computing a plurality of weights each corresponding to a respective one of a sub-plurality of high-confidence array-coordinates, each of the plurality of weights being determined by at least one of a distance between the high-confidence array-coordinates and the low-confidence array-coordinate and a difference between pixel-values of neighboring high-confidence array-coordinates to the low-confidence array-coordinate's associated primary pixel-value; and when a sum of the plurality of weights exceeds a predetermined weight-threshold, computing the assigned pixel-value as an average of each pixel-value, of the sub-plurality of high-confidence array-coordinates, multiplied by its corresponding one of the plurality of weights.

3. The method of claim 2, in the step of computing the plurality of weights, each of the plurality of weights being a function of a proximity metric that is a monotonically decreasing function of the distance.

4. The method of claim 2, in the step of computing the plurality of weights, each of the plurality of weights being a function of a similarity metric that is a monotonically decreasing function of the difference.

5. The method of claim 1, in the step of computing, each of the plurality of first confidence values being based on at least one of a relative difference and a standard deviation of the neighboring primary-pixel-values.

6. The method of claim 1, further comprising generating the first coordinate mapping.

7. The method of claim 2, the low-confidence array-coordinate's primary pixel-value being associated with the first color filter, and further comprising:

computing a plurality of scaling factors each corresponding to a respective one of the sub-plurality of high-confidence array-coordinates, each of the plurality of scaling factors being proportional to a ratio of the low-confidence array-coordinate's primary pixel-value to the pixel-value at the high-confidence array-coordinate associated with the first color filter; and when the sum exceeds the predetermined weight-threshold, computing the assigned pixel-value as an average of each pixel-value, of the sub-plurality of high-confidence array-coordinates, multiplied by its corresponding one of the plurality of weights and its corresponding one of the plurality of scaling factors.

8. The method of claim 2, when the sum of the plurality of weights is less than the predetermined weight-threshold, setting the assigned pixel-value proportional to a pixel-value associated with a most proximate of the plurality of neighboring high-confidence array-coordinates that has a first, second, and third pixel-value, corresponding to the first, second, and third color filters respectively, that satisfy a color-neutrality condition.

9. An image demosaicer for processing an image captured by an image sensor having an arrayed plurality of sensor pixels each located at a respective one of a plurality of array-coordinates, the plurality of sensor pixels including at a first sub-plurality of array-coordinates, a first sub-plurality of sensor pixels each filtered by a respective first color filter, at a second sub-plurality of array-coordinates, a second sub-plurality of sensor pixels filtered by a respective second color filter, and at a third sub-plurality of array-coordinates, a third sub-plurality of sensor pixels filtered by a respective third color filter, comprising:

a memory storing non-transitory computer-readable instructions and adapted to store the image;

a microprocessor adapted to execute the instructions to:

compute, for each of a first plurality of interpolated pixel-values and based on neighboring primary pixel-values, a respective one of a plurality of first confidence values each corresponding to an array-coordinate of either the second or the third plurality of array-coordinates, the first plurality of interpolated pixel-values being interpolated from neighboring primary pixel-values, of a first plurality of primary pixel-values, generated by the first sub-plurality of sensor pixels;

generate a first thresholded mapping from a first coordinate mapping by removing each interpolated pixel-value, and array-coordinate mapped thereto, having a first confidence value less than a threshold value, the first coordinate mapping including each of the second and the third plurality of array-coordinates mapped to a respective one of a first plurality of interpolated pixel-values;

repeat the steps of computing and generating for the second sub-plurality of sensor pixels to yield a second thresholded mapping;

repeat the steps of computing and generating for the third sub-plurality of sensor pixels to yield a third thresholded mapping;

determine a plurality of high-confidence array-coordinates as array-coordinates, of the plurality of array-coordinates, included in each of the first, second, and third thresholded mappings, the remaining array-coordinates being a plurality of low-confidence array-coordinates;

form a refined image that includes, at each of the plurality of high-confidence array-coordinates, a respective pixel-value-triplet including one primary pixel-value and two interpolated pixel-values; and fill the refined image by assigning, for each of the plurality of low-confidence array-coordinates, a pixel-value based on pixel-values of neighboring high-confidence array-coordinates.

10. The image demosaicer of claim 9, each of the plurality of low-confidence array-coordinates having an associated primary pixel-value of one of the first, second, and third coordinate mapping, the microprocessor being further configured to, in the step of filling and for each of the plurality of low-confidence array-coordinates proximate to a sub-plurality of the plurality of high-confidence array-coordinates, compute a plurality of weights each corresponding to a respective one of a sub-plurality of high-confidence array-coordinates, each of the plurality of weights being determined by at least one of: a distance between the high-confidence array-coordinates and the low-confidence array-coordinate and similarity of pixel-values of neighboring high-confidence array-coordinates to the low-confidence array-coordinate's associated primary pixel-value; and when a sum of the plurality of weights exceeds the predetermined weight-threshold, compute the assigned pixel-value as a weighted average of pixel-values of the sub-plurality of high-confidence array-coordinates.

11. The image demosaicer of claim 9, in the step of computing, each of the plurality of first confidence values being based on at least one of a relative difference and a standard deviation of the neighboring primary-pixel-values.

12. The image demosaicer of claim 10, each of the plurality of weights being a function of a proximity metric that is a monotonically decreasing function of the distance.

13. The image demosaicer of claim 10, each of the plurality of weights being a function of a similarity metric that is a monotonically decreasing function of the difference.

14. The image demosaicer of claim 9, the microprocessor being further adapted to, when the plurality of high-confidence array-coordinates includes an isolated high-confidence array-coordinate completely surrounded by low-confidence array-coordinates, designate the isolated high-confidence array-coordinate as a low-confidence array-coordinate.

15. The image demosaicer of claim 10, the microprocessor being further adapted to, when the sum of the plurality of weights is less than the predetermined weight-threshold, set the assigned pixel-value proportional to a pixel-value associated with a most proximate of the plurality of neighboring high-confidence array-coordinates that has, a first, second, and third pixel-value, corresponding to the first, second, and third color filters respectively, that satisfy a color-neutrality condition.

* * * * *